(12) United States Patent
Takami et al.

(10) Patent No.: US 11,548,370 B2
(45) Date of Patent: Jan. 10, 2023

(54) INDUSTRIAL HYBRID ENGINE

(71) Applicant: KUBOTA Corporation, Osaka (JP)

(72) Inventors: Masayasu Takami, Sakai (JP); Tamotsu Kuno, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 178 days.

(21) Appl. No.: 15/985,235

(22) Filed: May 21, 2018

(65) Prior Publication Data

US 2019/0001806 A1 Jan. 3, 2019

(30) Foreign Application Priority Data

Jun. 30, 2017 (JP) .............................. JP2017-128565

(51) Int. Cl.
| | | |
|---|---|---|
| *B60K 6/485* | (2007.10) | |
| *B60L 50/16* | (2019.01) | |
| *F16H 7/12* | (2006.01) | |
| *F02B 67/06* | (2006.01) | |
| *B60K 6/405* | (2007.10) | |
| *F02D 41/00* | (2006.01) | |
| *F16H 7/08* | (2006.01) | |

(Continued)

(52) U.S. Cl.
CPC .............. *B60K 6/485* (2013.01); *B60K 6/405* (2013.01); *B60L 50/16* (2019.02); *F02B 67/06* (2013.01); *F02D 41/0007* (2013.01); *F16H 7/12* (2013.01); *F16H 7/1281* (2013.01); *B60W 10/08* (2013.01); *B60W 20/15* (2016.01); *F16H 2007/081* (2013.01); *F16H 2007/0874* (2013.01)

(58) Field of Classification Search
CPC ......... B60K 6/485; B60K 6/405; B60L 50/16; F02B 67/06; F16H 7/12; F16H 7/1281
USPC ....................................... 123/193.6
See application file for complete search history.

(56) References Cited

U.S. PATENT DOCUMENTS 959,667 A    5/1910  White
3,413,866 A * 12/1968 Ford ..................... F16H 7/1272
                                                474/138

(Continued)

FOREIGN PATENT DOCUMENTS

DE    102015119521 A1   9/2016
JP       H08100670 A    4/1996
(Continued)

OTHER PUBLICATIONS

European Search Report dated Dec. 4, 2018 issued in EP Application No. 18171331.4.

(Continued)

*Primary Examiner* — Lindsay M Low
*Assistant Examiner* — Omar Morales
(74) *Attorney, Agent, or Firm* — Panitch Schwarze Belisario & Nadel LLP

(57) ABSTRACT

In an industrial hybrid engine, an endless rotary band wound around a drive pulley of a crankshaft and a motor pulley of an electric motor for power is provided. The electric motor is attached to an engine body by using a support bracket. A tension mechanism is supported by the support bracket, the tension mechanism tensioning the endless rotary band in a direction in which the endless rotary band is stretched. A second support bracket that supports the electric motor separately from the support bracket is provided.

10 Claims, 9 Drawing Sheets

(51) Int. Cl.
  *B60W 20/15*    (2016.01)
  *B60W 10/08*    (2006.01)

(56)  References Cited

U.S. PATENT DOCUMENTS

| | | | | |
|---|---|---|---|---|
| 4,596,538 | A | * | 6/1986 | Henderson ............ F16H 7/1218 |
| | | | | 474/135 |
| 4,758,208 | A | | 7/1988 | Bartos et al. |
| 2003/0050141 | A1 | * | 3/2003 | Aketa .................... F02B 63/00 |
| | | | | 474/118 |
| 2006/0217222 | A1 | | 9/2006 | Lolli et al. |
| 2007/0037648 | A1 | | 2/2007 | Di Giacomo et al. |
| 2009/0298631 | A1 | | 12/2009 | Jud et al. |
| 2013/0260932 | A1 | * | 10/2013 | Adam .................. F16H 7/1218 |
| | | | | 474/134 |

FOREIGN PATENT DOCUMENTS

| | | | |
|---|---|---|---|
| JP | 2006299844 | A | 11/2006 |
| JP | 2015025538 | A | 2/2015 |
| JP | 2015182512 | A | 10/2015 |
| JP | 2016191365 | A | 11/2016 |

OTHER PUBLICATIONS

Office Action dated Sep. 29, 2019 in EP Application No. 18171331.4.
Office Action dated May 14, 2020 in JP Application No. 2017-128565.
Office Action dated Apr. 21, 2021 in Chinese Application No. 201810492903.4.

* cited by examiner

INDUSTRIAL HYBRID ENGINE

CROSS-REFERENCE TO RELATED APPLICATION

This application claims priority under 35 U.S.C. § 119(b) to Japanese Patent Application No. 2017-128565, filed Jun. 30, 2017, the disclosure of which is incorporated herein by reference in its entirety.

BACKGROUND OF THE INVENTION

(1) Field of the Invention

The present invention relates to an industrial hybrid engine.

(2) Description of Related Art

An alternator of a conventional engine has a support structure in which one side of the alternator is pivotally supported with one bolt in a swingable and movable manner and the other side is bolted in an arc-circularly movable manner.

SUMMARY OF THE INVENTION

When an industrial engine is hybridized, an electric motor for assisting the engine output needs to be high-capacity, that is, clearly large and heavy as compared with an alternator that is used for a conventional engine. The strength of the support structure of the alternator of the conventional engine is prone to being insufficient and a further structural device is thus required.

It is an object of the present invention to provide an industrial hybrid engine in which a heavy and large electric motor can be reasonably supported, by devising a support structure of an electric motor.

The present invention is characterized in that in an industrial hybrid engine, an endless rotary band (transmission belt) 9 wound around a drive pulley 6a of a crankshaft 6 and a motor pulley 8a of an electric motor (motor generator) 8 for power is provided, the electric motor 8 is attached to an engine body h by using a support bracket 19, and a tension mechanism (belt tension mechanism) 18 is supported by the support bracket 19, the tension mechanism tensioning the endless rotary band 9 in a direction in which the endless rotary band 9 is stretched. For example, the electric motor 8 is preferably attached to one side of the support bracket 19 and the tension mechanism 18 is attached to the other side of the support bracket 19. It is also possible to add a second support bracket 20 that supports the electric motor 8.

According to the present invention, the electric motor is attached to the engine body in a fixed position by using the support bracket, and the tension mechanism for stretching the endless rotary band is provided separately, so that it is possible to support a large and heavy electric motor with sufficient strength while constantly favorably tensioning the endless rotary band.

Further, both support of the electric motor and support of the tension mechanism can be performed with one support bracket, which also provides an advantage that compactness and cost reduction can be achieved by the combined configuration.

BRIEF DESCRIPTION OF THE DRAWINGS

FIG. 6A is a front view thereof and FIG. 6B is a bottom view thereof;
FIG. 7A is a left side view thereof and FIG. 7B is a rear view thereof;
FIG. 8A is a front view thereof and FIG. 8B is a plan view thereof;
FIG. 9A is a left side view thereof and FIG. 9B is a rear view thereof.

DETAILED DESCRIPTION OF PREFERRED EMBODIMENTS

Figure 1:
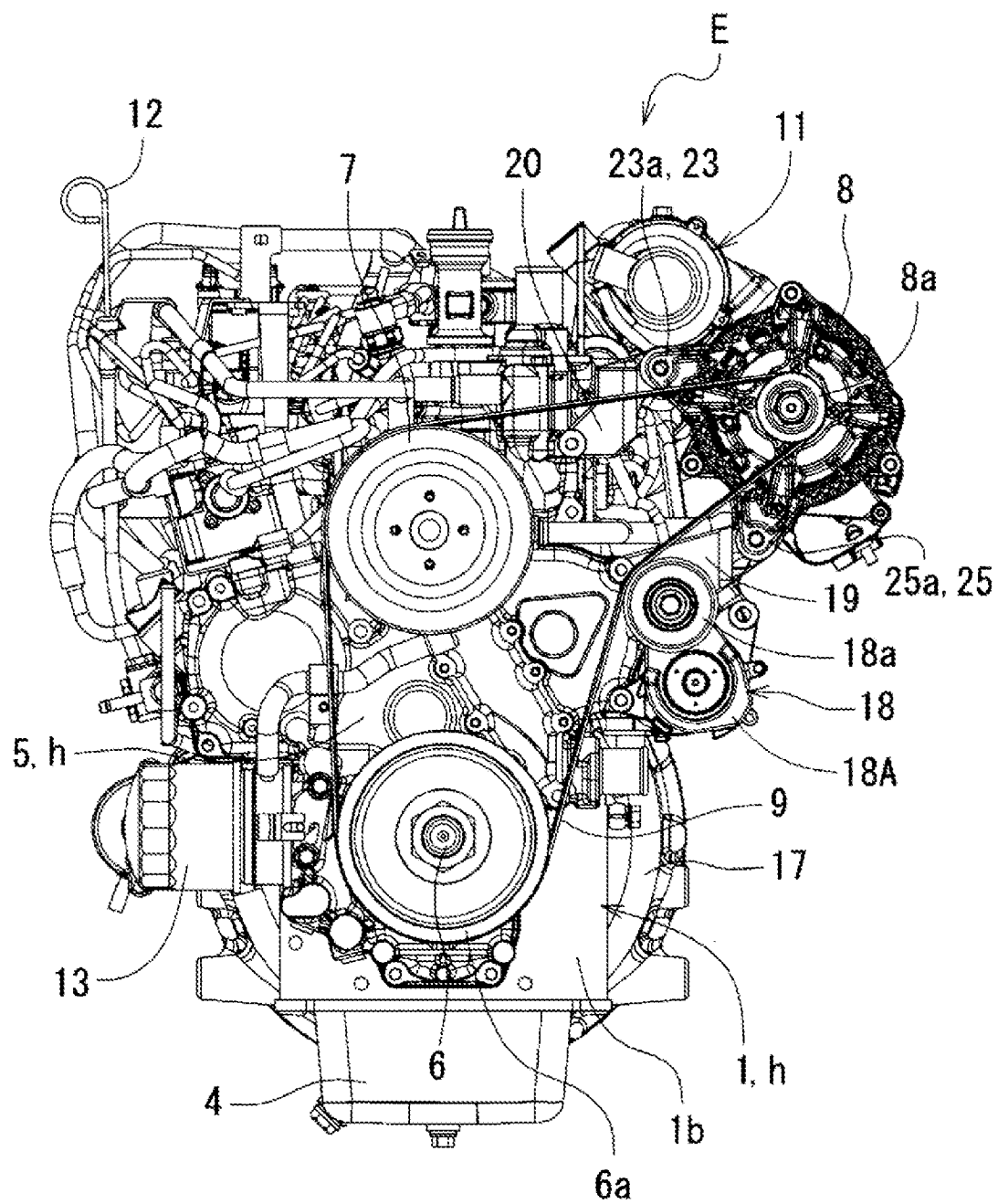
FIG. 1 is a front view of an industrial hybrid diesel engine.

Hereinafter, the case of applying an embodiment of an industrial hybrid engine according to the present invention to a diesel engine for an agricultural machine will be described with reference to the drawings. In this industrial engine E, the side having a transmission belt 9 is defined as front, the side having a flywheel housing 17 as rear, the side having an exhaust manifold 10 as left, and the side having an oil filter 13 as right. An engine body h is a concept of having a cylinder block 1, a cylinder head 2, a head cover 3, and a transmission case 5.

Figure 2:
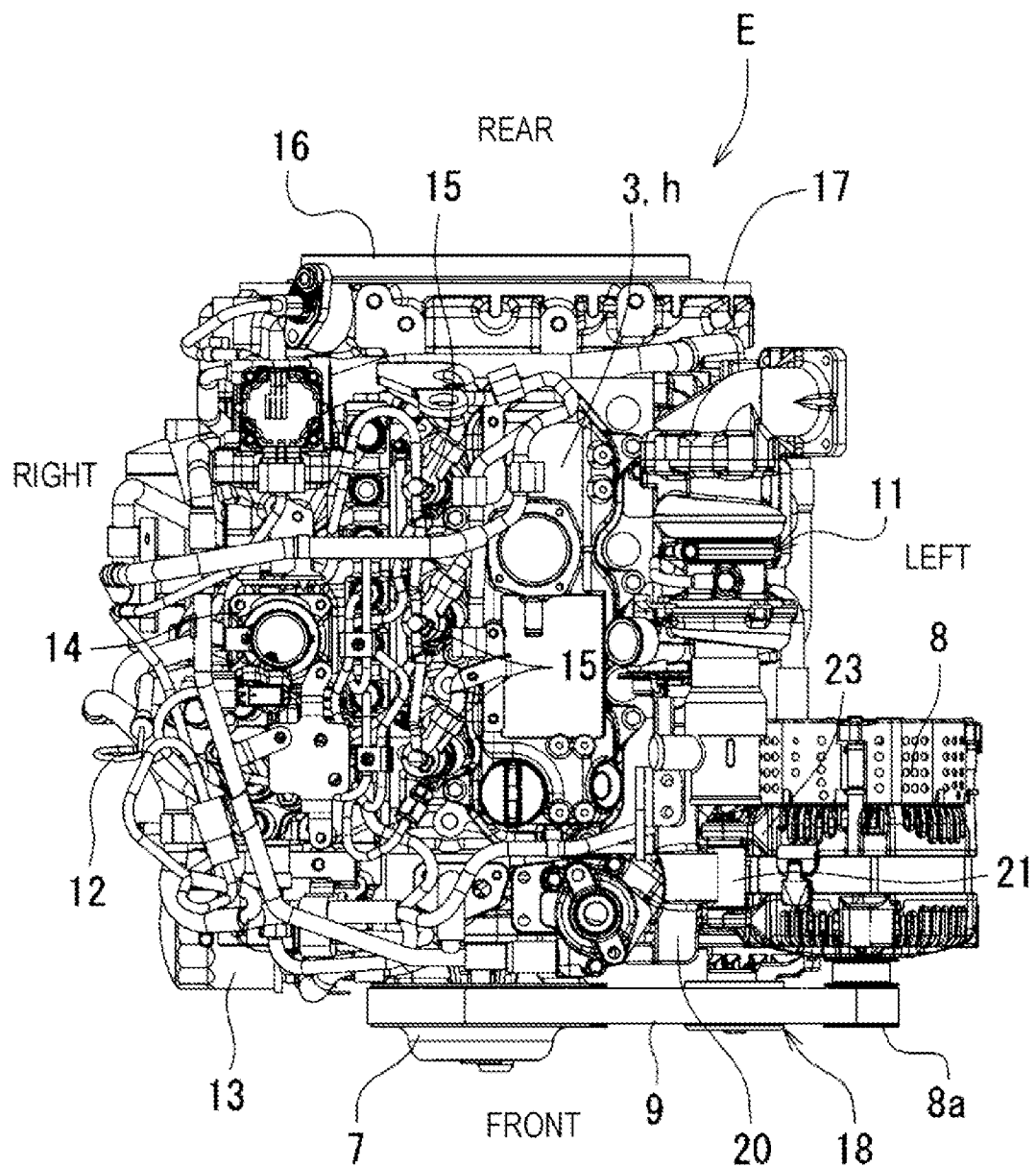
FIG. 2 is a plan view of the engine of FIG. 1.
Figure 3:
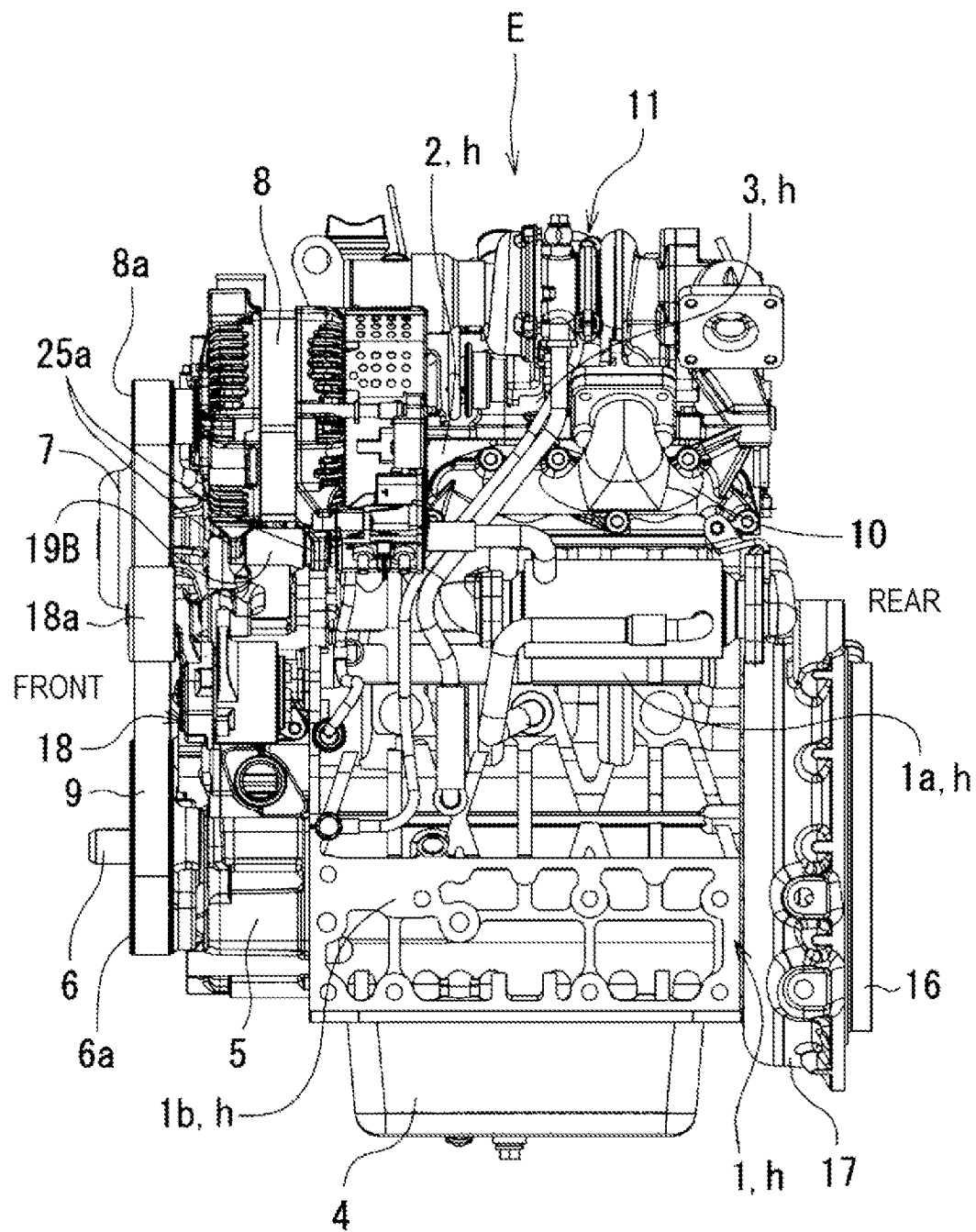
FIG. 3 is a left side view of the engine of FIG. 1.

As shown in FIGS. 1 to 3, in an in-line three-cylinder industrial hybrid diesel engine (hereinafter abbreviated simply as engine) E, the cylinder head 2 is assembled on the top of the cylinder block 1 and an oil pan 4 is assembled on the bottom of the cylinder block 1. A lower part of the cylinder block 1 is formed as a crankcase 1b, and an upper part thereof is formed as a cylinder 1a. The head cover (cylinder head cover) 3 is assembled on the cylinder head 2. The transmission case 5 is assembled in front of the cylinder block 1.

As shown in FIGS. 1 to 3, in the front portion of the engine E, the transmission belt (an example of an endless rotary body) 9 is provided over a drive pulley 6a of a crankshaft 6, a fan pulley 7 for driving a cooling fan (not shown), and a motor pulley 8a of an electric motor 8 being a motor generator. On the left side of the engine E, the exhaust manifold 10, a supercharger (turbo) 11, the electric motor 8 and the like are provided. On the right side of the engine E, the oil filter 13, an intake manifold 14, an oil level gauge 12 and the like are provided, and three injectors 15 are disposed thereabove. A flywheel 16 and the flywheel housing 17 are provided at the rear of the engine E.

As shown in FIGS. 1 to 4, a belt tension mechanism (an example of a tension mechanism) 18 that presses and energizes the flexible transmission belt 9 to the fan pulley 7 side is provided between the drive pulley 6a and the motor pulley 8a in the state of being located on the left of the transmission case 5. The belt tension mechanism 18 includes a tension pulley 18a pressed against the rear surface (outer circumferential surface) of the transmission belt 9, a swing arm 18A pivotally supporting the tension pulley 18a at its tip, and a tension body 18B that rotates and energizes the swing arm 18A in a Z direction (left direction) indicated by an arrow around a shaft center P.

As shown in FIGS. 1 to 5, the electric motor 8 is a relatively large (high output) power electric motor having a circular shape in a longitudinal view, and its weight is heavier than that of a general electric motor. For this reason, a first support bracket 19 on the lower side and a second support bracket 20 on the upper right side are used to firmly attach the electric motor 8 to the engine body h. In the belt tension mechanism 18, the upper side and the lower side of the tension body 18B are attached to the first support bracket 19 and the engine body h with bolts, respectively.

As shown in FIGS. 6A to 7B, the first support bracket 19 is a metal part having a bracket base 19A, a tip boss portion 19B, and a protrusion 19C and having a triangular shape in a front view. The bracket base 19A has two longitudinally oriented attachment holes 19*a*, 19*a* for bolting to the transmission case 5 on the base end side (right side). An auxiliary hole 19*d* for attaching other parts is formed through the bracket base 19A, and an attachment screw 19*e* for attaching other parts is formed on the back side.

The tip boss portion 19B has a mounting hole 19*b* for bolting the electric motor 8 and is formed in a stepped portion rearward of the bracket base 19A. The protrusion 19C has a threaded hole 19*c* which is a nut portion for bolting the tension body 18B and protrudes downward from the tip side (left side) of the bracket base 19A.

As shown in FIGS. 8A to 9B, the second support bracket 20 includes a front attachment portion 20A, a rear attachment portion 20B, and a bracket main portion 20C located between the front and rear attachment portions 20A, 20B in a state of connecting upper portions of those front and rear attachment portions 20A, 20B. The front attachment portion 20A has a longitudinally oriented hole 20*a* for bolting to the front surface of the cylinder head 2 in a lower portion thereof. The rear attachment portion 20B has a laterally oriented hole 20*b* for bolting to the left side surface of the cylinder head 2, and a pair of front and rear vertically oriented female screws 22 is formed in the upper portion of the rear attachment portion 20B.

The bracket main portion 20C includes a support boss portion 21 having a longitudinally oriented support hole 21*a* and protruding leftward. A forked bracket 23 protruding rightward is provided in the electric motor 8, and the forked bracket 23 is coupled to the bracket main portion 20C with a bolt 24 that is allowed to pass therethrough in a state where the support boss portion 21 is interposed between a pair of front and rear arm portions 23*a*, 23*a* of the forked bracket 23 (see FIG. 5). Note that reference symbol 20D denotes an action piece protruding rearward from the rear attachment portion 20B.

Figure 4:
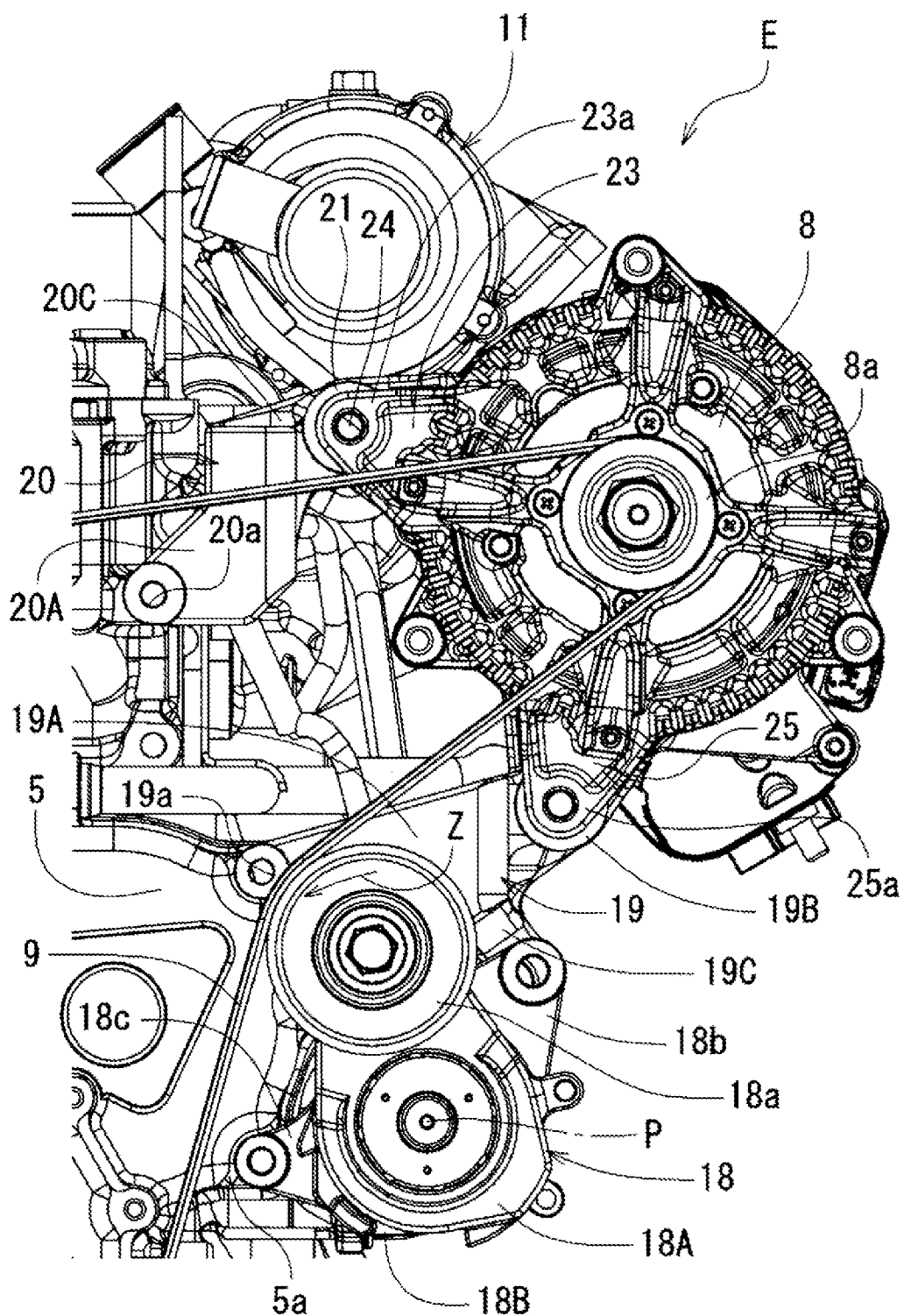
FIG. 4 is an enlarged front view of an electric motor and its vicinity in the engine of FIG. 1.
Figure 5:
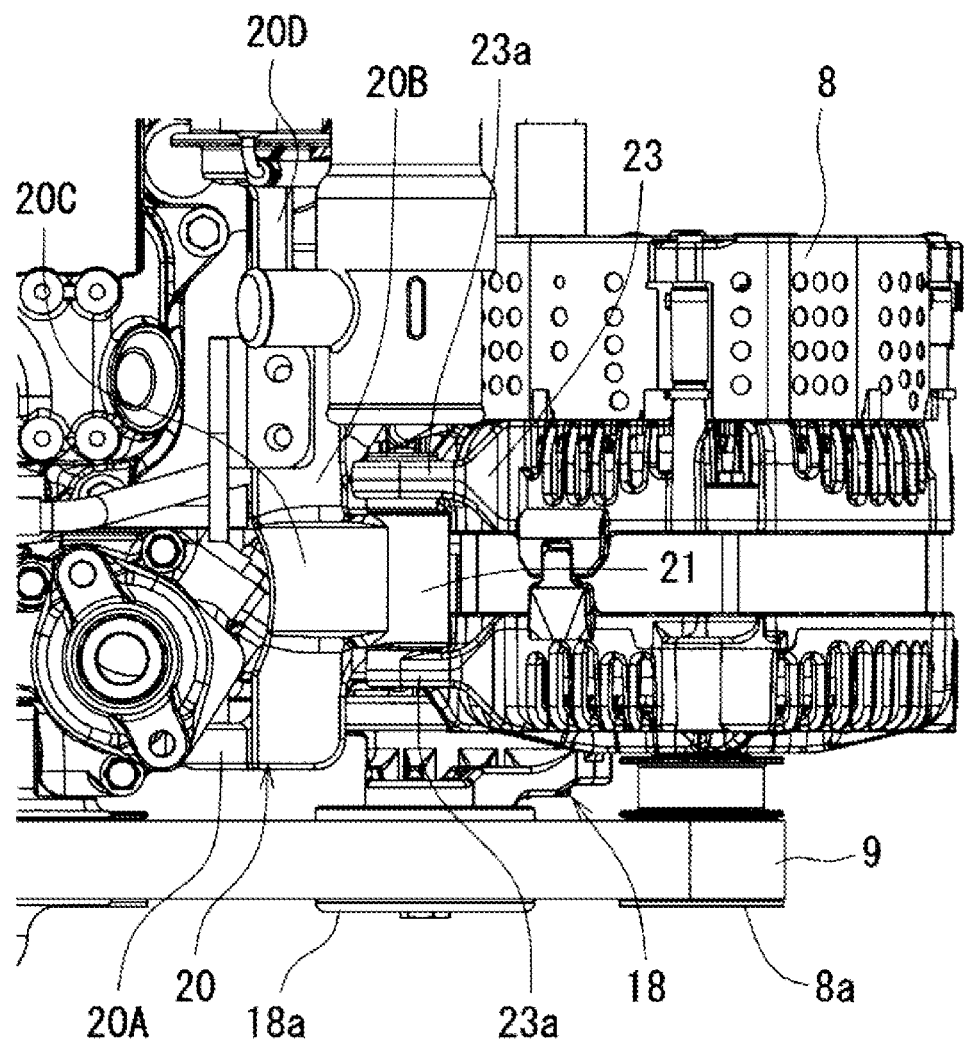
FIG. 5 is an enlarged plan view of the electric motor and its vicinity in the engine of FIG. 1.
Figure 6A:
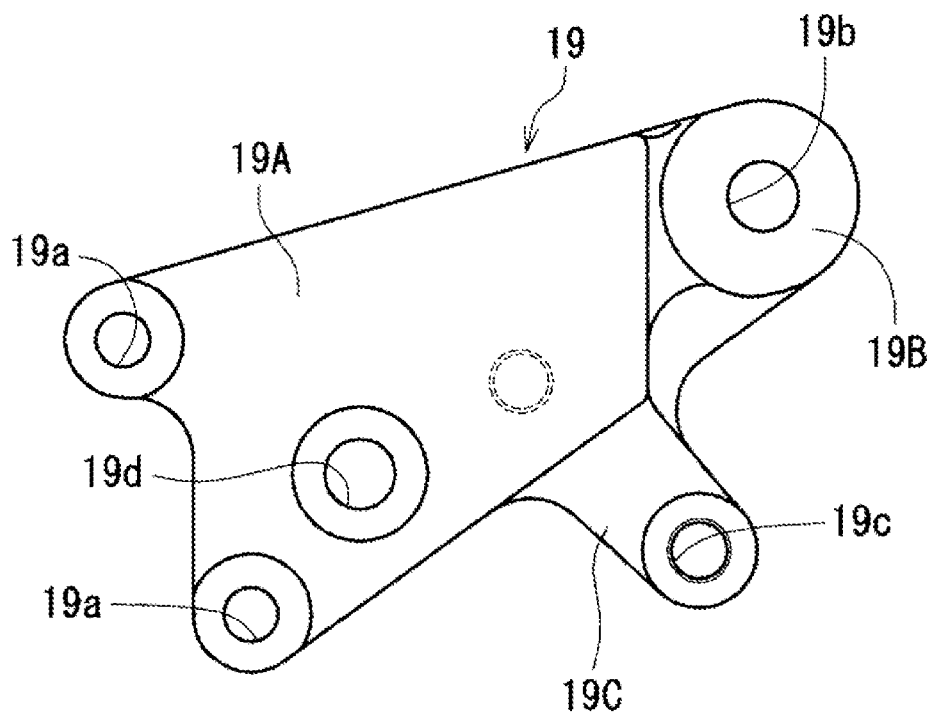
FIGS. 6A and 6B show a first support bracket, where
Figure 6B:
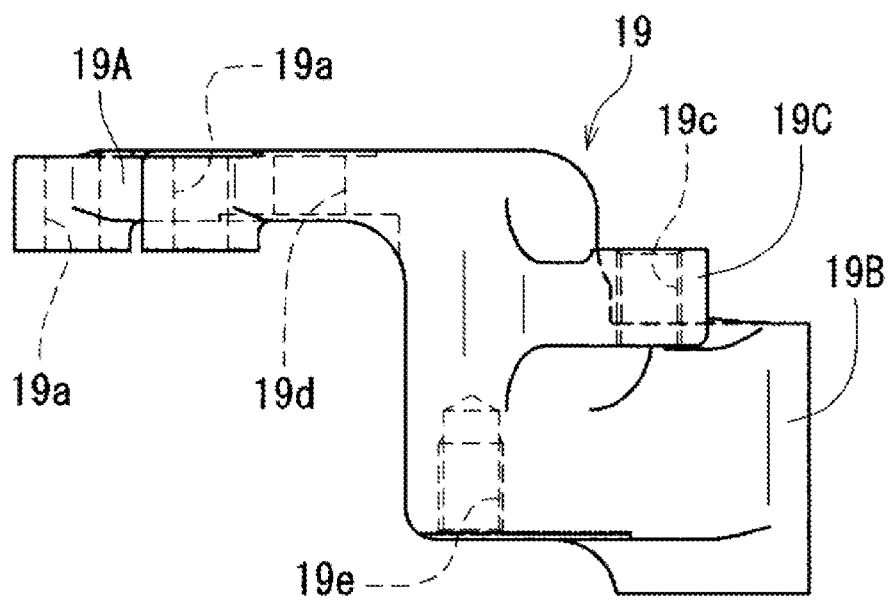
Figure 7A:
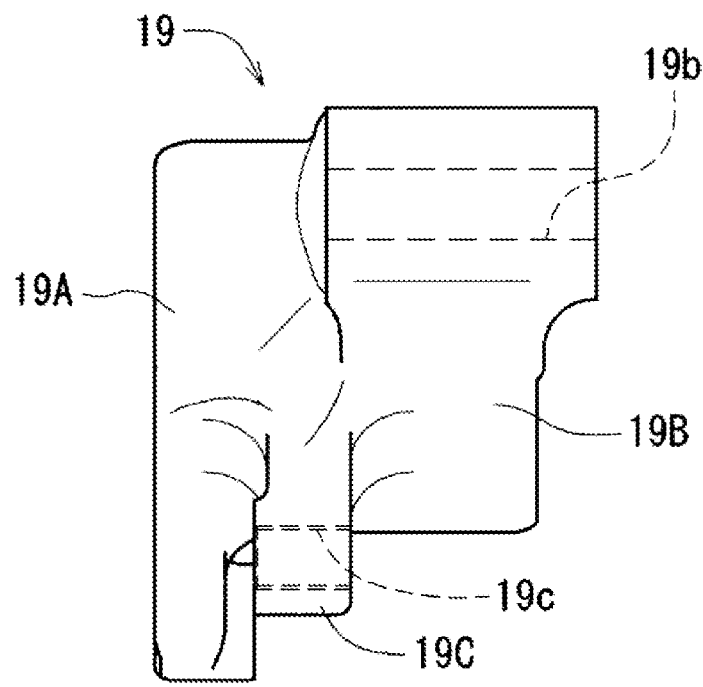
FIGS. 7A and 7B show the first support bracket, where
Figure 7B:
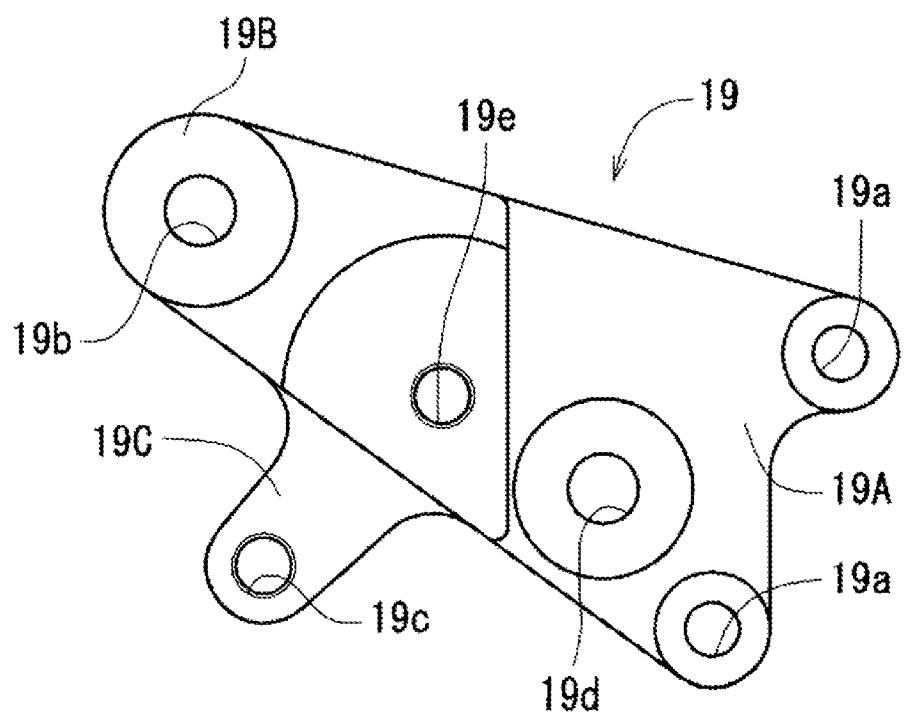
Figure 8A:
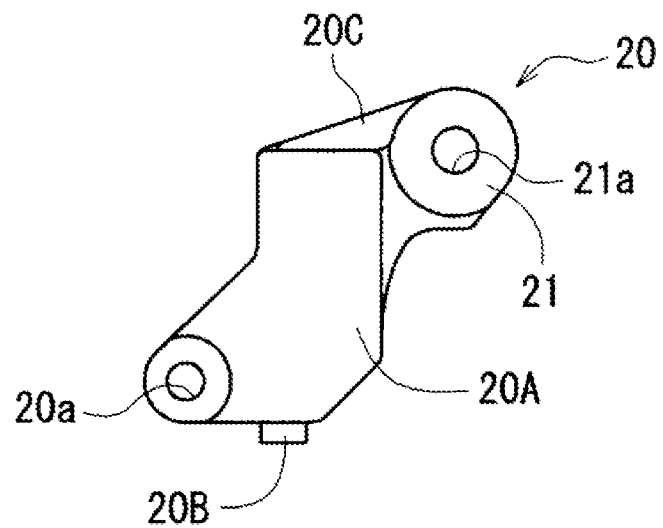
FIGS. 8A and 8B show a second support bracket, where
Figure 8B:
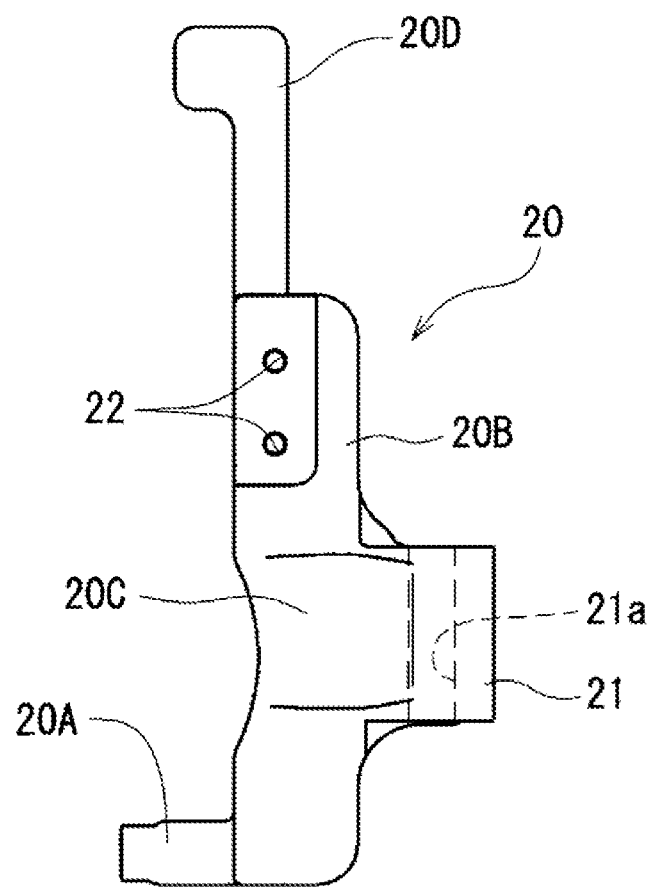
Figure 9A:
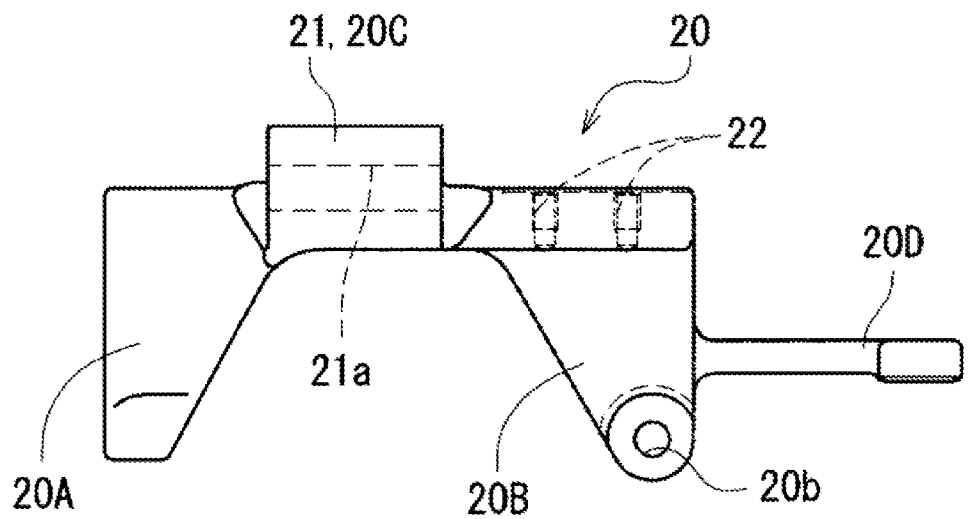
FIGS. 9A and 9B show the second support bracket, where
Figure 9B:
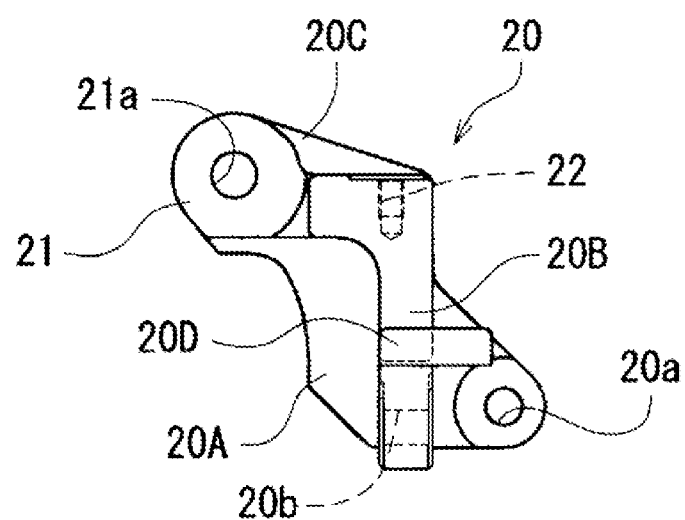

As shown in FIGS. 4 and 5, the bracket base 19A of the first support bracket 19 is screwed to the upper left side portion of the transmission case 5 with two bolts (not shown), so that the first support bracket 19 is attached in the state of protruding left diagonally upward. An arm portion 25*a* of a forked bracket 25 on the lower side of the electric motor 8 and the tip boss portion 19B are bolted to each other and an upper stay 18*b* of the tension body 18B and the protrusion 19C are bolted to each other. A lower right stay 18*c* of the tension body 18B is bolted to an attachment portion 5*a* of the transmission case 5.

That is, the first support bracket 19 is a strengthening member interposed for supporting the lower side of the electric motor 8 on the transmission case 5 (engine body h), and is also a strengthening member for supporting the belt tension mechanism 18. The electric motor 8 is disposed on the upper side of the first support bracket 19, and the belt tension mechanism 18 is disposed on the lower side of the first support bracket 19. The belt tension mechanism 18 is supported by the engine body h such that one part (upper stay 18*b*) thereof is bolted to the transmission case 5 via the first support bracket 19 and another part (lower right stay 18*c*) thereof is bolted directly to the transmission case 5.

As shown in FIGS. 4 and 5, in the second support bracket 20, the front attachment portion 20A is bolted to the front surface side of the cylinder head 2 and the rear attachment portion 20B is bolted to the left side surface of the cylinder head 2, so that the second support bracket 20 is attached to the engine body h. The forked bracket 23 of the electric motor 8 is then bolted to the front and rear of the support boss portion 21. That is, the upper portion of the electric motor 8 is supported by the cylinder head 2 via the second support bracket 20.

As described above, the electric motor 8 is provided on one side (upper side) of the first support bracket 19 in the left diagonally upward direction (the protruding direction from the engine body h), and the belt tension mechanism 18 is provided on the other side (lower side) of the first support bracket 19. The first support bracket 19 is attached to the exhaust manifold 10 disposed side (left side) of the engine body h. The first support bracket 19 is attached to the transmission case 5 mounted on one end (front end) of the cylinder block 1, and the second support bracket 20 for supporting the electric motor 8 separately from the first support bracket 19 is mounted on the cylinder head 2.

According to the industrial hybrid engine E of the present invention, the following effects (1) to (5) can be expected.

(1) The electric motor is attached to the engine body in a fixed position and the tension mechanism for stretching the endless rotary band is provided separately, so that it is possible to support a large and heavy electric motor with sufficient strength while constantly moderately tensioning the endless rotary band into a favorable state.

(2) With the support structure of the electric motor 8 formed by the first and second support brackets 19, 20, the large and heavy electric motor 8 can be supported with sufficient strength on the engine body h, and it is possible to achieve the engine E with a micro hybrid specification capable of making the engine layout compact.

(3) The attachment structure of the first and second support brackets 19, 20 to the engine body h is a joint fastening configuration using bolt holes which have hitherto been present, so that a specification can be selectively set between a hybrid specification and a normal engine specification by a simply structured, inexpensive measure, depending on the presence or absence of the support brackets 19, 20.

(4) With the first support bracket 19 also supporting the tension mechanism 18, it is unnecessary to attach a new attachment boss or the like to the transmission case 5 (cylinder block 1) and the cylinder head 2. Hence there is an advantage that the electric motor 8 can be disposed in the form of replacing an alternator in the conventional engine, and a simple and compact engine layout can thus be applied.

(5) One support bracket (first support bracket) 19 can reasonably support two kinds of structures, the electric motor 8 and the tension mechanism 18.

What is claimed is:
1. An industrial hybrid engine comprising:
an engine body,
a cylinder head,
an endless rotary band wound around a drive pulley of a crankshaft and a motor pulley of an electric motor for power, a first support bracket attached to the engine body, a lower side of the electric motor being attached at a fixed position on the engine body via the first support bracket, a separate, second support bracket supported only by the cylinder head, an upper side of the electric motor being attached to the second support bracket, wherein the second support bracket includes a front attachment portion, a rear attachment portion, and an action piece protruding rearward from the rear attachment portion, the front attachment portion being bolted to a front surface of the cylinder head and the rear attachment portion being bolted to a left side surface of the cylinder head, and a tension mechanism supported by the first support bracket, the tension mechanism including a tension pulley, a swing arm pivotally supporting the tension pulley proximate a tip of the swing arm and a tension body configured to energize the swing arm around a shaft center, the tension mechanism being configured to tension the endless rotary band in a direction in which the endless rotary band is stretched.

2. The industrial hybrid engine according to claim 1, wherein the electric motor is disposed on one side of the first support bracket in a direction protruding from the engine body, and the tension mechanism is disposed on the other side.

3. The industrial hybrid engine according to claim 2, wherein the first support bracket is attached to the exhaust manifold disposed side of the engine body.

4. The industrial hybrid engine according to claim 3, wherein the first support bracket is attached to a transmission case mounted on one end of a cylinder block.

5. The industrial hybrid engine according to claim 2, wherein the first support bracket is attached to a transmission case mounted on one end of a cylinder block.

6. The industrial hybrid engine according to claim 1, wherein the first support bracket is attached to the exhaust manifold disposed side of the engine body.

7. The industrial hybrid engine according to claim 6, wherein the first support bracket is attached to a transmission case mounted on one end of a cylinder block.

8. The industrial hybrid engine according to claim 1, wherein the first support bracket is attached to a transmission case mounted on one end of a cylinder block.

9. The industrial hybrid engine of claim 1, wherein the tension body is configured to energize the swing arm around the shaft center while supported by the first support bracket.

10. The industrial hybrid engine of claim 9, wherein the electric motor and the cylinder head are positioned at an equal height.

* * * * *